Nov. 16, 1943.                H. ALLEN                2,334,166
                    COMBINATION VALVE AND CHOKE
             Filed Oct. 5, 1940           2 Sheets-Sheet 1
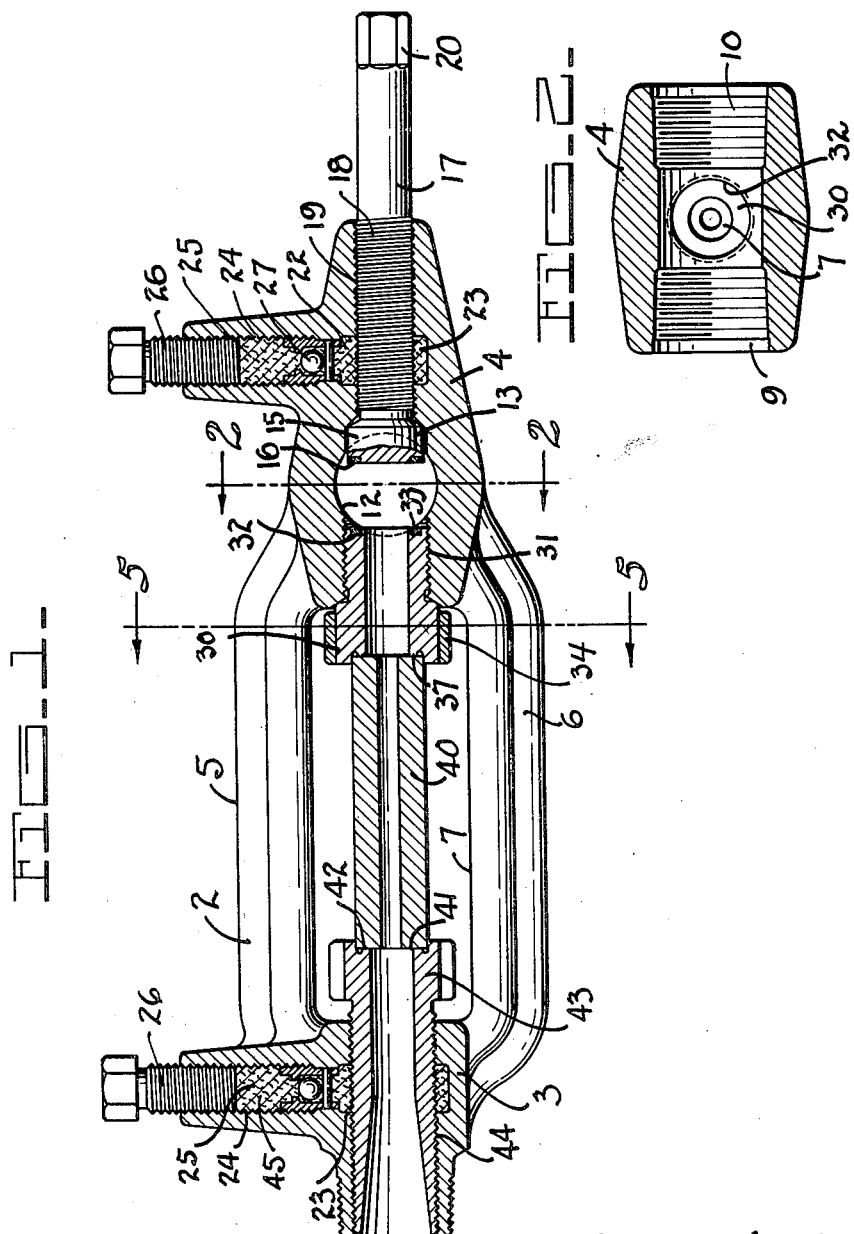
HERBERT ALLEN
*INVENTOR.*
BY  Lester B. Clark
        ATTORNEY Nov. 16, 1943.  H. ALLEN  2,334,166
COMBINATION VALVE AND CHOKE
Filed Oct. 5, 1940  2 Sheets-Sheet 2
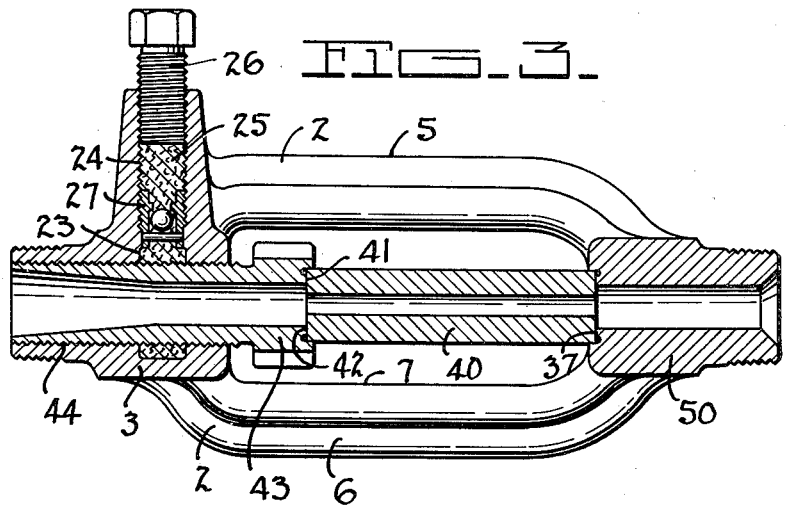
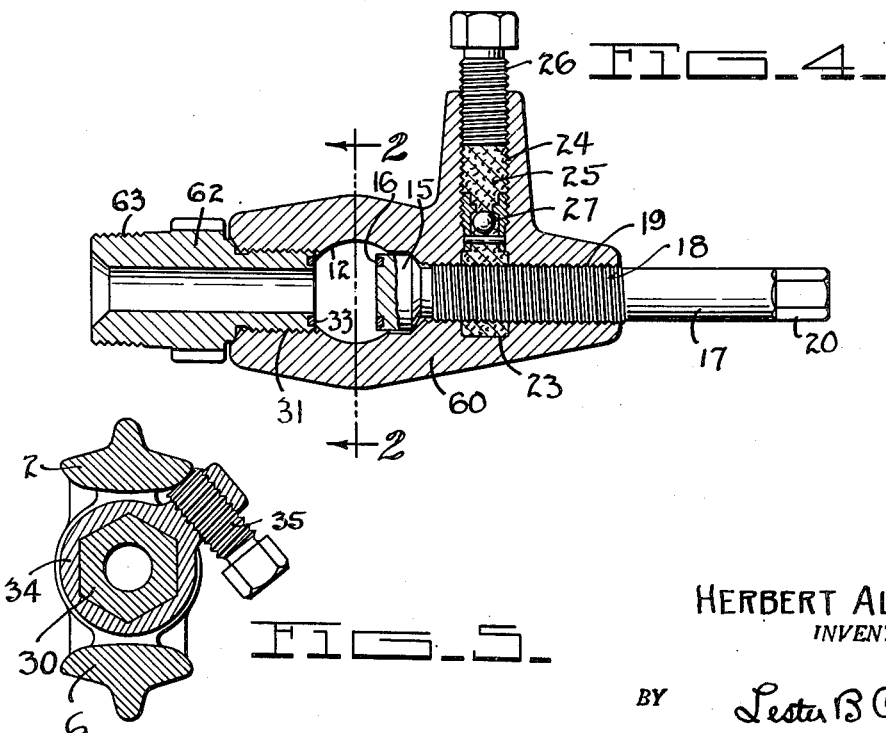
HERBERT ALLEN
*INVENTOR.*
BY Lester B Clark
ATTORNEY Patented Nov. 16, 1943

2,334,166

UNITED STATES PATENT OFFICE 2,334,166

COMBINATION VALVE AND CHOKE

Herbert Allen, Houston, Tex., assignor to Cameron Iron Works, Houston, Tex.

Application October 5, 1940, Serial No. 359,825

4 Claims. (Cl. 137—69)

The invention relates to a combination flow valve and choke of the type utilized on oil and gas wells to control the flow therefrom.

It is one of the objects of the invention to provide a combination choke and valve which may be utilized where high pressures are encountered and where the choke member must be replaced periodically due to wear from the more or less abrasive fluid which passes therethrough under high pressure.

Another object of the invention is to provide a frame with an adjustable valve to control the flow through a replaceable choke.

Another object of the invention is to provide a fluid pressure seal about the adjustable portion of a flow choke.

Another object of the invention is to provide a fluid pressure seal about the movable stem of a valve member.

Another object of the invention is to provide a combination choke and valve with a fluid pressure seal about the adjustable portions thereof.

Other and further objects of the invention will be readily apparent when the following description is considered in connection with the accompanying drawings wherein:

Fig. 1 is a side elevation in vertical section of the combination choke and valve with the fluid pressure seal applied thereto.

Fig. 2 is a section taken on the line 2—2 of Fig. 1 and illustrating the mode of connection of the device and the arrangement of the valve seat.

Fig. 3 shows a modified form of the device where only the flow choke is embodied in the frame work.

Fig. 4 shows a form of the invention where the valve is utilized without the choke construction.

Fig. 5 is a section on the line 5—5 of Fig. 1 showing the manner of clamping the flow nipple in place.

In Fig. 1 the combination choke and valve is made up generally upon a framework 2 which is in the form of a longitudinal member having the body 3 at one end and the body 4 at the other end, which bodies are joined by the spaced arms 5 and 6. These arms in this manner provide an open space 7 intermediate the frame.

The body 4 has the side connections 9 and 10 which are threaded to receive the pipe to which the combination valve and choke is to be attached. If an entrance is made at the opening 9 then the opening 10 may be closed with a suitable plug if desired, or in some instances both openings may receive flow lines by which a flow into the combination can be accomplished.

In order to close the entrance passage 12 of the device a valve 13 has been arranged in the body portion 4. This valve has a head 15 which carries a packing seal 16 and is operated by means of the spindle of stem 17 which is threaded at 18 into the complementary threads 19 on the inside of the body 4. A non-circular portion 20 on the stem facilitates the turning thereof.

In order to provide a seal about this spindle and prevent leakage along the spindle a fluid pressure packing 22 has been provided. This packing includes an annular recess 23 in the body 4 about the stem 18, which recess is joined by lateral passage or reservoir 24 into which a body of lubricant or liquid 25 may be introduced. A cap screw 26 can be threaded into the reservoir 24 to force the fluid past a check valve 27 into the annular recess 23. In this manner any desired pressure can be applied to the plastic packing material and a preponderance of pressure maintained to overcome the expected pressure in the passage 12.

The body 4 carries a flow nipple 30 which is threaded at 31 to fit into the body. The right hand end of this nipple carries a seat 32 against which the end of the valve 13 is arranged to abut. A packing 33 may be provided so as to facilitate the maintaining of a seal. Fig. 5 shows a locking ring 34 fitted about the flow nipple 30 and having a screw 35 therein to be turned against the frame 2 to lock the nipple in place.

The left hand end of the nipple 30 carries a seat 37 which is arranged to receive the end of a flow choke 40. This choke is arranged to be inserted thru the opening 7 and into engagement with the seat 37 on the flow nipple 30. The other end 41 of this choke engages a seat 42 on a second flow nipple 43. This second flow nipple is disposed in the body portion 3 and is adjustable by means of the threads 44. In this manner the choke 40 can be rigidly clamped in position between the two flow nipples. A pressure packing 45 similar to the pressure packing 22 previously described has been incorporated in this body portion 3.

From the foregoing construction it seems obvious that the valve 13 may be closed when it is desired to replace the choke 40, and the choke replaced by unscrewing the nipple 43 to release and replace the choke. The valve 13 can then be opened and the flow initiated without requiring disassembling or removal of the combination valve and choke.

Fig. 3 shows a somewhat different form of the choke where the body 4 and the flow nipple 30 have been combined into a single element 50 which is formed as an integral part of the frame 2. The left hand end of this flow choke is the same as described in connection with Fig. 1. The only adjustable member is the flow nipple 43. The pressure packing 45 to maintain a seal about this adjustable member is the same as described in connection with Fig. 1.

Fig. 4 shows a form which is a modification of Fig. 1 in that the framework 2 and the flow choke portion have been omitted with the body 60 constituting the equivalent of the body 4 of Fig. 1. The flow nipple 30 has been modified to provide a nipple or bushing 62 which has a threaded area 63 to receive the discharge pipe. The remaining parts including the valve 13 are the same as described in connection with Fig. 1.

What is claimed is:

1. A combination valve and choke assembly including a frame, means to removably position a flow choke in said frame including a nipple adjustable in said frame, a valve also adjustable in said frame to close said choke, and means to provide a pressure seal at the ends of said frame about said nipple and said valve.

2. A combination valve and choke including a frame, a nipple adjustable therein, means to form a plastic seal by the application of pressure to the plastic about said nipple, a choke to abut said nipple, a second nipple in said frame to abut said choke whereby the choke is confined, a seat on the end of said last nipple, and a valve member movable axially of the nipple in said frame to engage said seat to close said assembly.

3. A combination valve and choke including a body, a pair of spaced, movable flow nipples and a choke therebetween carried by said body, means to adjust one of said nipples to retain or release said choke, a valve to move against the end of the other of said nipples within the body to close the passage thru said combination, and a lock member for said last mentioned nipple.

4. A combination flow valve and choke assembly comprising a frame, a flow nipple movably mounted adjacent each end of said frame, a choke member to be positioned and confined between said nipples by adjustment of one of the nipples, means to lock one of said nipples in said frame, and a valve member at one end of said frame adjustable to close the end of one of said nipples by engagement therewith at a point within said frame.

HERBERT ALLEN.